United States Patent

[11] 3,589,085

| [72] | Inventor | Raymond W. Sickler |
| | | R.D. #2, Wellsburg, N.Y. 14894 |
| [21] | Appl. No. | 802,395 |
| [22] | Filed | Feb. 26, 1969 |
| [45] | Patented | June 29, 1971 |

[54] SKIRTING MEANS
8 Claims, 3 Drawing Figs.

[52] U.S. Cl. .................................................. 52/126, 52/483, 52/551
[51] Int. Cl. ..................................................... E04g 9/06, E04g 11/00
[50] Field of Search ........................................... 52/126, 127, 478, 483, 222, 155, 169, 518, 545, 544, 551, DIG. 3

[56] References Cited
UNITED STATES PATENTS

| 3,216,741 | 11/1965 | Newlin et al. | 52/155 |
| 3,256,655 | 6/1966 | Teeter | 52/169 |
| 3,343,326 | 9/1967 | Sickler et al. | 52/483 |
| 3,383,819 | 5/1968 | Zimmer et al. | 52/483 |
| 3,451,180 | 6/1969 | Struben | 52/222 |
| 3,236,932 | 2/1966 | Grigas et al. | 52/551 |

*Primary Examiner*—Frank L. Abbott
*Assistant Examiner*—James L. Ridgill, Jr.
*Attorney*—Shoemaker and Mattare ABSTRACT: A plurality of vertically extending posts are disposed between the lower edge of a trailer and the ground. Integral tabs are struck from the material of the posts and these tabs serve to support a plurality of horizontally disposed parallel panels. The lower portion of an upper panel includes a longitudinally extending recess in the bottom portion thereof which receives the upper edge of a panel disposed therebelow to interlock the panels with one another. The other edges of the panels are held in place by the tabs on the posts to thereby support the panels in operative position.

PATENTED JUN29 1971
3,589,085
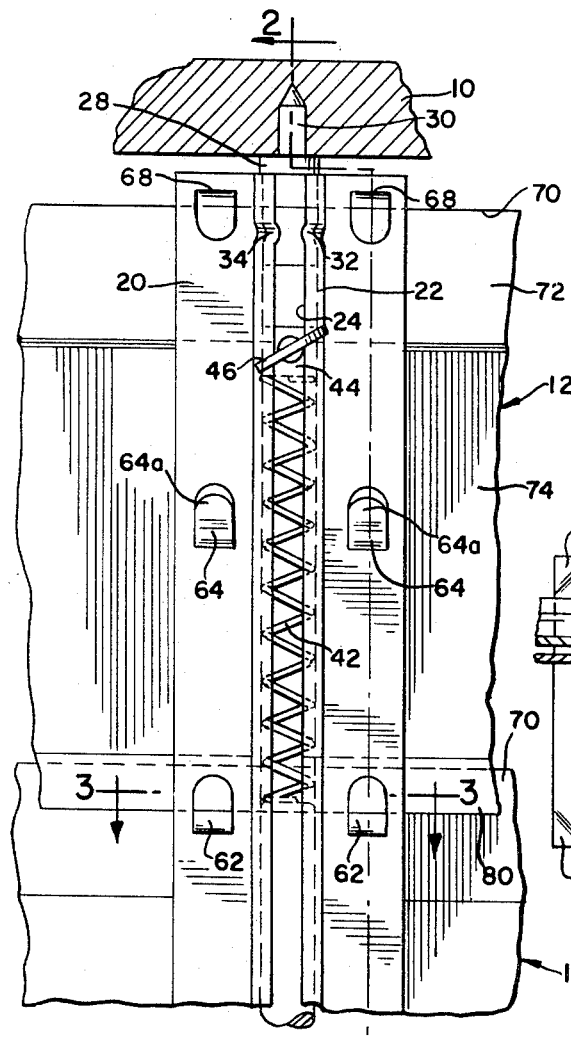
Fig.1.
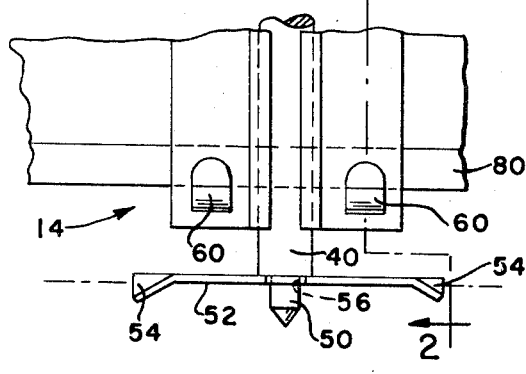
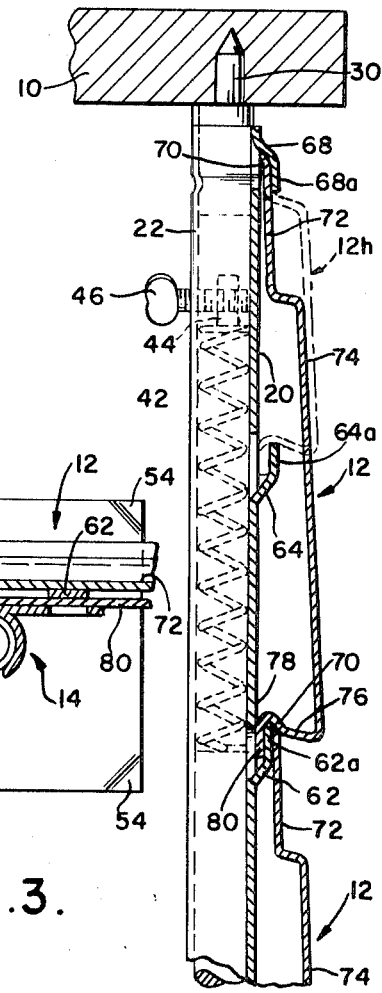
Fig.3.
Fig.2.
INVENTOR
Raymond W. Sickler
BY Shoemaker and Mattare
ATTORNEYS

SKIRTING MEANS

CROSS-REFERENCE TO RELATED APPLICATION

The present invention represents an improvement over the construction shown in U.S. Pat. No. 3,343,326.

BACKGROUND OF THE INVENTION

As in the aforementioned patent, the present invention relates to skirting means to be used with trailers such as mobile homes when they are mounted above the ground surface to serve as living quarters.

Since the bottom of the trailer is supported in spaced relationship to the ground to prevent undesirable corrosion and to prevent damage to the trailer due to changes in the contour of the ground, it is desirable to provide a skirting means to screen the space between the ground and the edge of the trailer to provide a neat finished appearance. This skirting means also serves the important purpose of preventing drafts of air from passing beneath the trailer which would cause the floor of the structure to be warmer in the summer and colder in the winter. In the construction as shown in the aforementioned patent, elongated horizontal spaces are defined between adjacent panels through which air can freely circulate. This is an undesirable feature, and an important aspect of the present invention is the provision of a construction which eliminates such spaces between adjacent panels and which at the same time maintains the advantages afforded by the construction as shown in the patent.

In the arrangement shown in the patent, the panels are held in place by snapping them under tabs formed integrally with the vertical posts of the structure. Since the panels are spaced from the parallel adjacent panels, the construction has limited strength and rigidity. A further disadvantage of the arrangement as shown in the aforementioned patent is the fact that the panels employed in the construction are all of the same width. It is often desirable to provide panels of different widths for ornamental reasons, and accordingly it is advantageous to provide a construction which enables panels of different widths to be readily mounted in place in the finished construction.

SUMMARY OF THE INVENTION

As in the aforementioned patent, the skirting means of the present invention is self-adjusting to accommodate different vertical heights between the ground and an edge of an associated trailer. The skirting can also be easily and quickly installed without the necessity of providing any special tools or experience. The construction is readily adaptable for different size trailers and the various skirt panels may be overlapped with one another in a horizontal direction so that they can be extended indefinitely for enclosing the space around trailers of widely varying size.

The skirting construction enables corners and door openings and the like to be readily made as desired. The individual skirt panels can be readily snapped into operative position in a quick and easy manner without providing any additional fasteners or the like. The panels are also rigidly held in position so that wind rattle is eliminated.

A particular feature of the present invention is the fact that a bottom portion of an upper panel includes a longitudinally extending channel which receives the upper edge of a panel disposed therebelow. This enables the panels to be readily interlocked with one another so as to provide a very rigid construction and at the same time permits the panels to be effectively snapped into place with respect to one another.

The arrangement is such that panels of a predetermined width can be mounted in place, or panels having substantially less width can be effectively mounted in place. In a typical example, first panel means may be provided having a certain width while second panel means may be provided having a width substantially one-half of that of the first-mentioned panel means. This enables a distinctive and attractive finished appearance to be obtained by varying the width of the panels.

BRIEF DESCRIPTION OF THE DRAWING

FIG. 1 is a view partly broken away looking at the rear of a vertical post of the present invention and illustrating a plurality of panels supported thereby;

FIG. 2 is a sectional view taken substantially along line 2-2 of FIG. 1 looking in the direction of the arrows; and FIG. 3 is a sectional view taken substantially along line 3-3 of FIG. 1 looking in the direction of the arrows.

DESCRIPTION OF THE PREFERRED EMBODIMENT

Referring now to the drawing, wherein like reference characters designate corresponding parts throughout the several views, the lower edge of a mobile home or trailer is indicated by reference numeral 10. The skirting means includes a plurality of elongated substantially horizontally disposed panels 12 supported by a vertical post 14. It will be understood that a plurality of spaced vertical posts are provided at suitable intervals about the trailer.

The post 14 includes an upper portion 20 comprising a sheet extrusion having an integral generally cylindrical portion 22 extending from one side thereof as seen most clearly in FIG. 3 and being provided with a longitudinally extending slot 24 throughout the length thereof. Means for engaging this structure at the upper end of the post includes a generally cylindrical member 28 having a reduced outer end portion 30 which is provided with a sharp point, this sharp point being received within a suitable hole drilled in the trailer, or on the other hand, this sharp point can be forced into a softer material if so desired. Member 28 is provided with a peripheral groove 32 on the outer surface thereof, and a peripherally extending part 34 of portion 22 is crimped as indicated into this groove so as to secure member 28 in the operative position shown.

The lower portion of the post includes a rodlike member 40 which is slidably received within the lower part of portion 22 of the post. A compression spring 42 is disposed within portion 22 and engages the upper end of member 40. The upper end of spring 42 is in engagement with a nut member 44 which is relatively snugly received within portion 22 and which has a thumbscrew 46 threaded therethrough. Thumbscrew 46 serves as a means for locking the nut 44 in any particular position within the portion 22 of the post. In this manner, the nut 44 can be moved to different positions within portion 22 to adjust the amount of spring force applied to member 40.

The lower end of rodlike member 40 is provided with a reduced end portion 50 terminating in a sharp point. A baseplate 52 is provided including four corners 54 which are bent downwardly to provide four sharp corner portions adapted to dig into a supporting surface. The reduced end portion 50 is loosely received within a central hole 56 formed in plate 52 to provide a limited universal interconnection therebetween to allow a certain amount of relative movement between the baseplate and member 40. This permits the baseplate to adjust to the slope of the underlying support surface while member 40 and the post remain in a generally vertical position.

Support means is provided on the vertical posts in the form of a plurality of integral struck-out tabs, these tabs being disposed in two vertical rows and also being oriented in horizontally disposed pairs. A lower horizontal pair of tabs 60 are struck out from spaced parts of portion 20 of the post, these tabs extending upwardly and initially extending out at an acute angle from the portion 20 and thence terminating in vertically upwardly extending portions 60a. A similar horizontal pair of tabs 62 include vertically extending upper portions 62a.

A further horizontal pair of tabs 64 also extend upwardly as the previously described tabs and terminate in vertically extending portions 64a. The uppermost horizontal pair of tabs 68 extend downwardly in contrast to all of the remaining tabs which extend upwardly. Tabs 68 terminate in substantially vertically depending portions 68a.

As illustrated, two panels 12 of substantially identical construction are provided, these being full width panels. When two full sized panels are disposed on the post as illustrated, the tabs 60, 62 and 68 are employed. The tabs 64 are spaced midway between tabs 62 and 68 and are adapted to be employed when a panel of substantially half the width of the panel 12 is used. As seen in FIG. 2, a half width panel is illustrated in phantom lines and is indicated by reference character 12h.

While only two full sized panels are illustrated along with the tabs required for holding them in place, it should be understood that any number of full width or half width panels may be employed, and the tabs correspondingly spaced apart on the associated posts.

Each of the panels includes an inwardly sloping upper edge portion 70 which joins with a downwardly and outwardly sloping portion 72. This portion 72 in turn joins with a substantially parallel downwardly sloping portion 74. Portion 74 joins with an upwardly and inwardly extending portion 76. Portion 76 includes a longitudinally extending channel portion or recess 78 which is adapted to receive the upper edge of the panel disposed therebeneath. Each panel terminates in a lower substantially vertically extending edge portion 80 which is adapted to be received under suitable tabs provided on the posts.

As seen in FIG. 2, the upper edge 70 of the top panel 12 is received under tab 68. The lower edge 80 of the upper panel is received under tab 62. The upper edge 70 of the bottom panel 12 is received within the channel 78 of the top panel, and the lower edge 80 of the bottom panel is received under the tab 60.

If a half-width panel such as panel 12h is employed, it is apparent that the upper edge of the panel is disposed under tab 68, while the lower edge of the panel is disposed under tab 64. Such half-width panels may be of substantially the same construction as the full width panels or may be of a slightly different construction as long as the upper and lower edges thereof are adapted to snap into place under the associated panels.

It is apparent that the aforedescribed arrangement enables the panels to be readily snapped into operative position, the panels interlocking with one another so as to provide a strong and rigid structure. This interlocking and overlapping arrangement of the channels eliminates any spaces between the horizontally extending channels so that the amount of air which can circulate through the skirting is substantially reduced.

The skirt panels are made of a suitable flexible material such as aluminum or the like which can be readily snapped into the operative position illustrated in the drawings. Adjacent panels in a horizontal direction are adapted to overlap one another at the end portions thereof so as to provide a substantially uninterrupted overall appearance to the finished structure.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Skirting means for screening the space between the ground and the lower edge of a trailer, comprising a plurality of substantially vertically disposed posts spaced from one another along said lower edge, each of said posts including a ground contacting means at one end thereof and trailer engaging means at the opposite end thereof, each of said vertical posts including a front support surface, each of said front support surfaces having a plurality of support means extending therefrom and spaced vertically on each post, a plurality of elongated flexible panels including at least a top panel and an adjacent bottom panel, each of said panels including a top edge and a bottom edge, said top panel being received behind a downwardly extending support means along its top edge and received behind an upwardly extending support means along its bottom edge, said top panel supported on said posts by engagement with said support means, a longitudinally extending recess in the bottom edge of said top panel disposed outwardly of said upwardly extending support means, the upper edge of said adjacent bottom panel disposed outwardly of said support means and received in and supported by said recess in the bottom edge of said top panel, the bottom edge of said bottom panel received behind an upwardly extending support means, said bottom panel supported on said posts by engagement of said upper edge in said recess and engagement of said bottom edge with said support means, said top and bottom panels extending longitudinally between at least two of said posts in generally parallel relationship with one another.

2. Skirting means as defined in claim 1 wherein said support means comprises tabs extending from the associated posts, said tabs being disposed in horizontal pairs with the base portions of adjacent tabs of a pair being disposed in alignment substantially along a common horizontal line.

3. Skirting means as defined in claim 2 wherein all of the tabs on a particular post extend upwardly with the exception of the uppermost tabs which extend downwardly.

4. Skirting means as defined in claim 1 wherein said support means on each of said posts includes tabs extending from the posts.

5. Skirting means as defined in claim 1 wherein said upper edge of the adjacent bottom panel engages an outer surface of the support means which is in engagement with the lower edge of said top panel.

6. Skirting means as defined in claim 1 wherein said support means comprises tabs extending from said posts, said panels including first panel means of a predetermined width and second panel means of substantially less width than said first panel means, said tabs being spaced from one another so as to receive each of said panel means.

7. Skirting means as defined in claim 1 wherein each of said posts includes an elongated spring and rod enclosure means, a spring and rod being disposed within said enclosure means, said spring urging said rod outwardly of said enclosure means.

8. Skirting means as defined in claim 1 wherein said support means comprises a plurality of tabs struck from the material of each of said vertical posts, all of said tabs extending upwardly with the exception of the uppermost tabs on each post which extend downwardly, said tabs being arranged in horizontal pairs, the upper edge of said top panel being received under the uppermost tab of an associated post, the lower edge of said bottom panel being received under the lowermost tab of an associated post.